INVENTORS
ARNOLD KALINOWSKI
RUDOLF BROCKMANN
BY
AGENT

United States Patent Office 3,250,995
Patented May 10, 1966

3,250,995
HALL PLATE WATTMETER CIRCUIT INCLUDING COMPENSATION FOR THE HALL PLATE THERMO-VOLTAGE
Arnold Kalinowski, Hamburg, and Rudolf Brockmann, Garstedt, Germany, assignors to North American Philips Company, Inc., New York, N.Y., a corporation of Delaware
Filed June 29, 1962, Ser. No. 206,446
Claims priority, application Germany, June 30, 1961, P 27,455
3 Claims. (Cl. 324—142)

This invention relates to wattmeter circuits including a Hall plate. Such circuits for measuring powers, or wattmeters utilising Hall plates are known. Wattmeters of this type operate, for example, in the audio-frequency range, without errors up to large phase shifts of the consuming device, since the measuring device exhibits a negligible internal phase error due to the absence of amplifiers of whatever kind in the current and voltage paths. The field coil, insofar as it lies between the voltage path and the consuming device, must be as small as possible in order to benefit by the full sensitivity and minimize the consumption of the wattmeter. The current through the voltage path (control current of the Hall plate) must therefore be a maximum. Disadvantages are then involved, and more particularly with Hall plates manufactured in mass production, because the control current gives rise to a thermo-voltage resulting from asymmetries in the structure of the Hall plate. The said thermo-voltage is a direct voltage which varies in magnitude as a function of the current in the plate. The polarity of this voltage depends only upon the structure of the plate, it being immaterial whether the plate is supplied with direct current or alternating current. The maximum or limiting value of the thermal voltage produced in any given plate is determined by the structure of the material of which the plate is composed, and is a fixed value for each plate. The thermo-voltage may be about 10% of the Hall voltage, so that the sensitivity and the accuracy of the wattmeter are considerably affected thereby.

These evils are suppressed in the novel wattmeter circuit according to the invention in that, in order to compensate for the thermo-voltage of the Hall plate, an element delivering an opposite thermo-voltage is connected in series opposition with the Hall plate. In order that the invention may be readily carried into effect, it will now be described in detail, by way of example, with reference to the accompanying drawing, in which.

Figure 1:
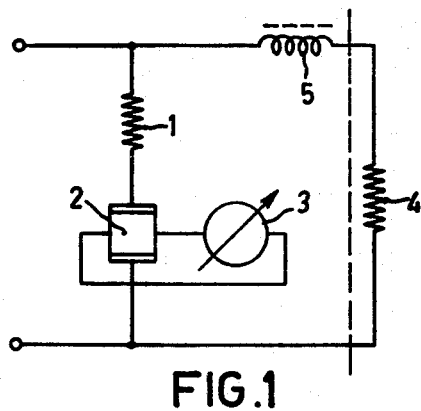
FIGURE 1 shows a circuit arrangement serving to explain the invention.

In FIGURE 1 the voltage path is formed by a series-resistor 1 and a Hall plate 2, to which an indicator instrument 3 is connected in known manner. The current path is formed by a consuming device 4 and a field coil 5 for providing the usual magnetic field for the Hall plate and containing a conventional soft-magnetic core with the Hall plate located in the air gap.

Figure 2:
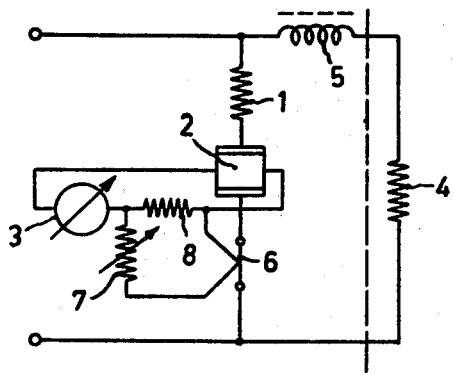
FIGURE 2 shows a compensation circuit utilizing a thermocouple.

In FIGURE 2 the voltage path of the wattmeter includes a thermocouple 6. The thermocouple heater is connected in series with the Hall plate 2, and is therefore traversed by the same current as the Hall plate. The resulting thermo-voltage is applied through a resistance network 7, 8 to the output circuit of the Hall plate 2, which includes the indicator instrument 3. The field coil is designated 5, the consuming device 4 and the series-resistor 1. The thermal voltage produced at the output terminals of the Hall plate 2 varies with the amplitude of the series current flowing in the branch circuit composed of resistor 1, Hall plate 2 and thermocouple 6. The thermal voltage produced by thermocouple 6 also varies with the value of the series current flowing in the aforesaid branch circuit. The two thermo-voltages are arranged to counteract each other. The compensation is optimally adjustable by the variable resistor 7. By this means, variations in the Hall plate thermal voltage which are caused by changes in the control current flowing in the voltage path of the wattmeter are substantially cancelled by equal and opposite thermal voltages produced by said current flowing in thermocouple 6.

Said circuit permits of substantially compensating for the thermo-voltage of the Hall plate. Thus, use may be made of mass-produced Hall plates for the structure of wattmeters with an indicator instrument which, for example in the audio-frequency range, have a sensitivity of 1 watt full deflection and only a phase error of about 10 sixtieths of one angular degree.

To increase still further the sensitivity of the wattmeter circuit or, at the same sensitivity, increase the resistance in the voltage path and reduce the resistance in the current path (field coil 5), which results in a decreased power consumption by the wattmeter itself, use may be made of so-called thin-layer plates. Their effective voltage is about ten times that of ordinary Hall plates.

What is claimed is:

1. Apparatus for measuring the electrical power supplied to a load circuit from a source of voltage, comprising winding means coupled to said load circuit for producing a magnetic field determined by the magnitude of the load current, a Hall plate mounted in said magnetic field comprising current input terminals and output terminals across which a Hall voltage and a thermal voltage are developed, said thermal voltage being variable with the value of current flowing through said current input terminals, means for compensating the thermal voltage variations of said Hall plate comprising a thermocouple element having a heater element serially connected with said Hall plate current input terminals, an energizing circuit coupled to said load circuit for supplying a current to said plate input terminals and said heater element proportional to the load voltage, said thermocouple element further comprising a pair of output electrodes for supplying a thermal voltage determined by the value of said heater current, indicating means, and means for coupling the voltage developed across said Hall plate output terminals and the thermal voltage of said thermocouple output electrodes to said indicating means in opposition.

2. Apparatus for measuring the electrical power supplied to a load circuit from a source of voltage, comprising a Hall plate having current input terminals and output terminals across which a Hall voltage and a current dependent thermal voltage are developed, input terminals for said voltage source for supplying a load current to said load circuit, winding means, means connecting said winding means and said load circuit in series circuit across said input terminals whereby said winding means produces a magnetic field through said plate having a magnitude which is determined by the magnitude of said load current, means for compensating the current dependent thermal voltage variations of said Hall plate comprising a thermocouple element having a heater element serially connected with said Hall plate current input terminals, means connecting the series circuit comprising said Hall plate current input terminals and said heater element across said input terminals whereby a current is supplied to said series circuit which is proportional to the load voltage, said thermocouple element further comprising a pair of output electrodes for supplying a thermal voltage determined by the value of said heater current, indicating means, and means for connecting the voltage developed across said Hall plate output terminals and the thermal voltage of said thermocouple output electrodes to said indicating means in series opposition.

3. Apparatus for measuring the electrical power supplied to a load circuit from a source of voltage, comprising electromagnetic means comprising a magnetic core structure having an air gap and a winding mounted thereon for producing a magnetic field in said gap, input terminals for said voltage source for supplying load current to said load circuit, means connecting said winding and said load circuit in series across said terminals whereby said winding carries the load current, a Hall plate mounted in said air gap transversely to said magnetic field, said Hall plate comprising current input terminals and output terminals across which a Hall voltage and a thermal voltage are developed, said thermal voltage being variable with the value of current flowing through said current input terminals, means for compensating the thermal voltage variations of said Hall plate comprising a thermocouple element having a heater element serially connected with said Hall plate current input terminals, means connecting the series circuit comprising said Hall plate current input terminals and said heater element across said input terminals whereby a current is supplied to said series circuit which is proportional to the load voltage, said thermocouple element further comprising a pair of output electrodes for supplying a thermal voltage determined by the value of said heater current, indicating means, a resistor, means connecting said resistor and said indicating means in series circuit across said Hall plate output electrodes, and means connecting said thermocouple output electrodes across said resistor whereby a voltage is developed across said resistor in opposition to the thermal voltage of said Hall plate.

References Cited by the Examiner
UNITED STATES PATENTS

| | | | |
|---|---|---|---|
| 2,016,894 | 10/1935 | Faus | 324—105 |
| 3,008,083 | 11/1961 | Kuhrt | 324—45 |
| 3,054,952 | 9/1962 | Lehrmann | 324—117 |

WALTER L. CARLSON, *Primary Examiner.*

R. V. ROLINEC, *Assistant Examiner.*